Sept. 26, 1967  J. BRANGER  3,343,406
PAUSE DETECTOR FOR CREEP TEST LOADING MACHINES
Filed Feb. 17, 1964
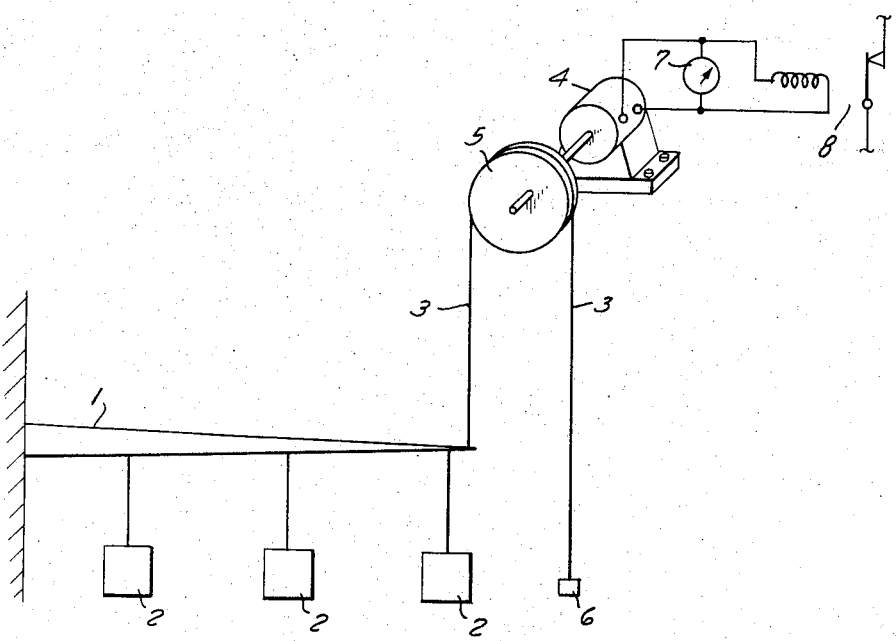
Jürg Branger,
INVENTOR
BY Michael S. Striker
ATTORNEY

United States Patent Office 3,343,406
Patented Sept. 26, 1967

---

3,343,406
PAUSE DETECTOR FOR CREEP TEST LOADING MACHINES
Jürg Branger, Lucerne, Switzerland, assignor to Eidgenossisches Flugzeugwerk, Emmen, Emmen, Lucerne, Switzerland, a company of Switzerland
Filed Feb. 17, 1964, Ser. No. 345,520
Claims priority, application Switzerland, Feb. 20, 1963, 2,224/63
4 Claims. (Cl. 73—90)

The instant invention relates to machines for determining the fatigue behavior and life expectancy of structures, and more particularly to automatic types thereof for ascertaining the fatigue phenomena of complicated structures under repeated applied loads.

While fatigue history simulating machines may be distance or load controlled, the load applied to the test specimen or structure is always the predominant factor so that control by distance at which the load is applied is acceptable only where there is absolute certainty that the stiffness of the specimen tested and its manner of attachment or anchorage remain linear and do not change throughout. In testing complex structures, as for example complete aircraft assemblies, over long periods of time and at different temperatures, satisfactory test results are obtained only with load controlled machines. In load testing of complicated structures, it is readily and clearly observable that even after reaching the magnitude of the required load by the applied forces, the test specimen deforms still more until ultimately a final state of rest is reached corresponding to the applied load. In that the deformation caused by such forces is important on the fatigue behavior of the complex structures being tested, such final state of rest must be awaited before subjecting the test structure to the next test load of the test program and schedule. Prior automatic fatigue-determining machines thus observed fixed intervals between applications of successive test loads. Hence the actual duration of all intervals had to take into account the longest expected waiting time for the test specimen to reach its final state after the application of each load of the test program. As a result, in most instances, time is wasted which is particularly objectionable where extended testing is undertaken.

An object of this invention is to speed up the time for complete testing by the provision of one or more indicators for signalling when the final state has been attained after a load application, and to initiate the succeeding load application.

This object, and others, as also the features of my invention will be more fully understood from the following description of an illustrative embodiment of the final condition of rest indicator of my invention when read in conjunction with the annexed drawing in which the sole figure is a simplified elevational view of such embodiment.

The portion of specimen 1 which is deformed and thus moves under the applied load 2 is so connected, for example by a thin wire 3 to a small electric generator 4 so that movement of the test specimen causes a rotation of the rotor of the generator. In the illustrative embodiment, the thin wire is passed over a disc or pulley 5 integrally mounted on the shaft of generator 4, the wire being appropriately tensioned by weight 6 attached to its free end. Generator 4 is firmly supported spatially, and as soon as the electric current produced by such rotation of its rotor ceases, the final rest condition of the specimen has been reached. With the cessation of such rotation, the generated potential also ceases. In known manner, such stopping of potential is used as a signal, not only to energize and actuate indicator 7, which may be of any known visible or audible type, to advise that the final condition of rest of the specimen under the particular load has been reached, but also to actuate a switch 8 to initiate the next load application step.

What I claim is:
1. In combination with a fatigue behavior testing machine for solid structures in which loads are to be applied at time intervals such that a new load is to be applied to the structure to be tested only after the structure has reached a final position under application of a preceding load, an indicator arrangement for indicating the moment the test structure has reached said final position, said indicator arrangement comprising an electric generator having a rotor; transmission means connecting a portion of the test structure which is deflected during application of a load to said rotor to drive the latter for the duration of movement of said portion during application of a load to said structure so as to produce an electric current; and signal means in circuit with said generator for signaling cessation of the current and thereby indicating the moment the test structure has reached its final position so that the next load may be applied thereto.

2. In the combination as set forth in claim 1, wherein said transmission means includes a pulley connected to said rotor for rotation therewith and elongated flexible means connecting said portion of the test structure to said pulley.

3. In the combination as set forth in claim 2, wherein said elongated flexible means includes a wire connected at one end to said portion of said structure and a weight connected to said other end of said wire, said wire passing between its ends over the periphery of said pulley.

4. In the combination set forth in claim 1, switch means arranged in circuit with said generator and actuated in dependency upon cessation of rotation of said rotor of said generator.

References Cited
UNITED STATES PATENTS

| | | | |
|---|---|---|---|
| 2,388,256 | 11/1945 | Davis | 73—90 |
| 2,445,682 | 7/1948 | Macgeorge | 73—90 |
| 2,647,393 | 8/1953 | Stewart | 73—90 X |

JAMES J. GILL, *Primary Examiner.*
RICHARD C. QUEISSER, *Examiner.*
J. W. MYRACLE, *Assistant Examiner.*